United States Patent [19]

Thomas et al.

[11] 3,839,116
[45] Oct. 1, 1974

[54] METHOD OF MAKING ENDLESS POWER TRANSMISSION BELT HAVING A PLURALITY OF LONGITUDINALLY EXTENDING RIBS

[75] Inventors: James R. Thomas, Springfield; George E. North, Republic; Alden W. Brooks, Springfield, all of Mo.

[73] Assignee: Dayco Corporation, Dayton, Ohio

[22] Filed: Sept. 10, 1973

[21] Appl. No.: 396,045

[52] U.S. Cl. ............... 156/138, 74/234, 156/140, 156/165, 156/189, 156/245, 156/500, 156/537, 264/313, 425/DIG. 44
[51] Int. Cl. ..................... B29h 7/22, F16g 1/00
[58] Field of Search .............. 156/137–142, 156/160–162, 165, 187–189, 192–194, 196–198, 212, 228, 232, 242, 244, 245, 247, 248, 287, 460, 471–473, 475, 500, 537, 581; 264/313, 318, 224; 425/DIG. 44, 393, 403, 436, 438, 440, 445, 446; 74/231 C, 231 R, 232–234

[56] References Cited
UNITED STATES PATENTS

| 2,392,373 | 1/1946 | Freedlander | 74/234 |
| 2,669,280 | 2/1964 | Augustin | 156/140 |
| 2,728,239 | 12/1955 | Adams | 74/234 |
| 2,773,540 | 12/1956 | Waugh | 156/138 |
| 2,802,511 | 8/1957 | Waugh | 156/138 |
| 3,078,205 | 2/1963 | Sauer et al. | 156/137 |
| 3,250,653 | 5/1966 | Geist et al. | 156/138 |
| 3,464,875 | 9/1969 | Brooks | 156/138 |
| 3,473,989 | 10/1969 | Richmond | 156/140 |
| 3,607,502 | 9/1971 | Marzocchi | 156/137 |
| 3,799,824 | 3/1974 | Arnao et al. | 156/139 |

Primary Examiner—Clifton B. Cosby
Assistant Examiner—John E. Kittle

[57] ABSTRACT

A method of making endless power transmission belts each having a plurality of longitudinally extending ribs is provided and employs a collapsible tubular matrix sleeve which is reusable to define a belt sleeve which is then cut to define a plurality of the belts each having the longitudinally extending ribs.

28 Claims, 24 Drawing Figures

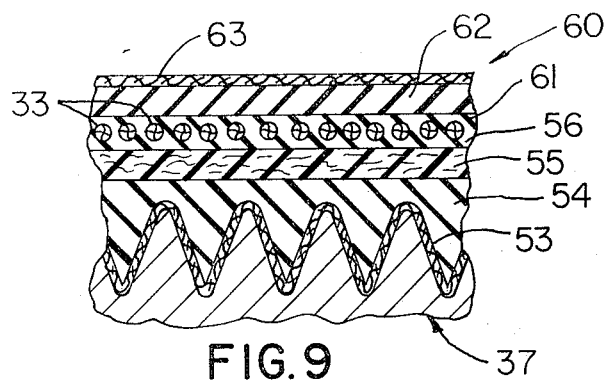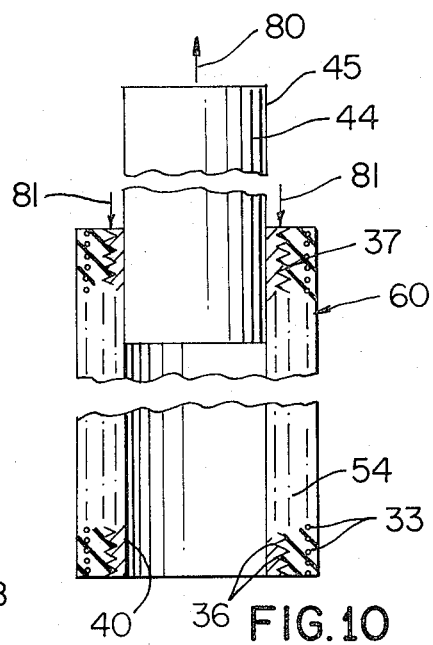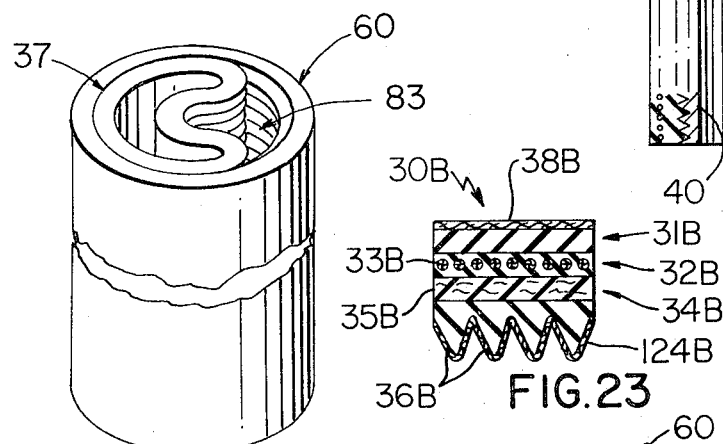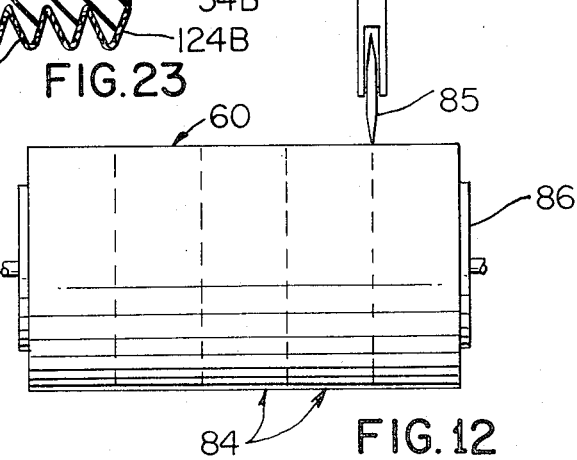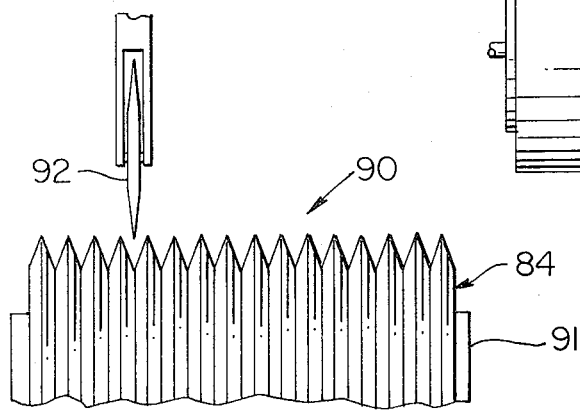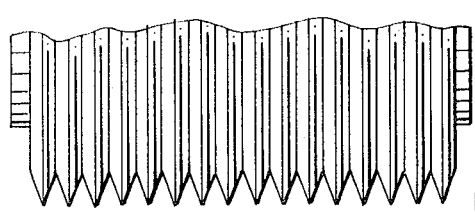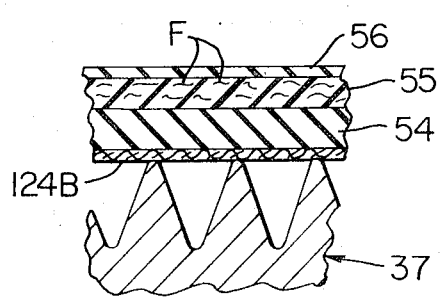

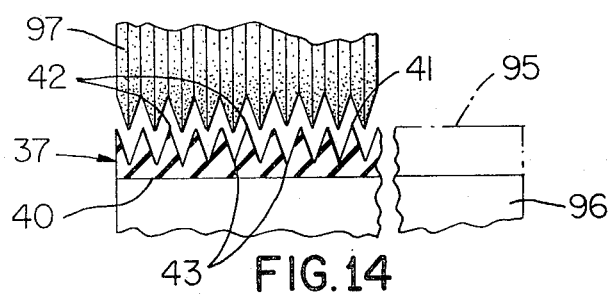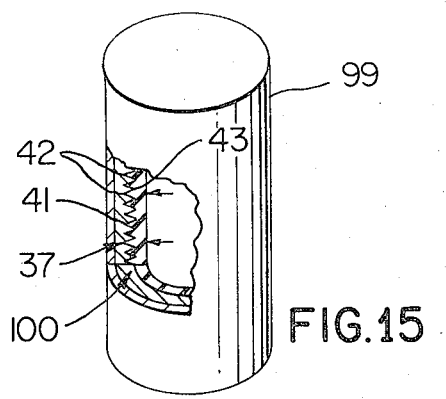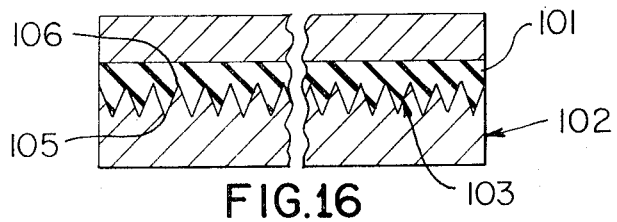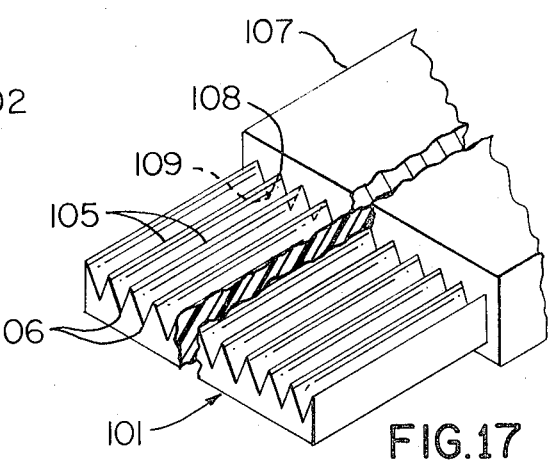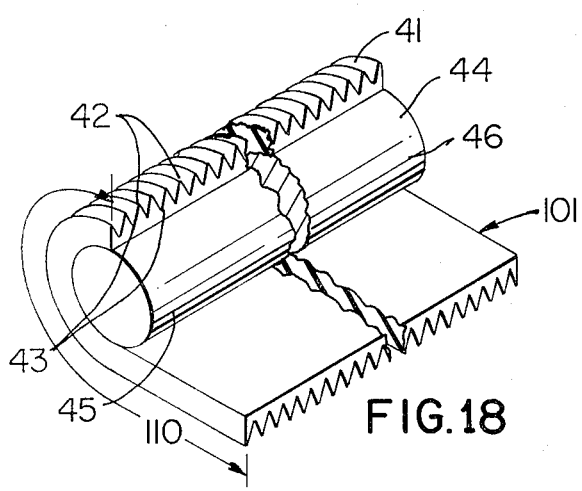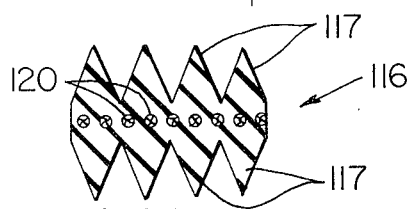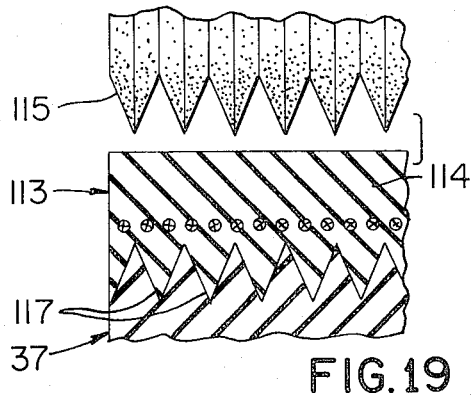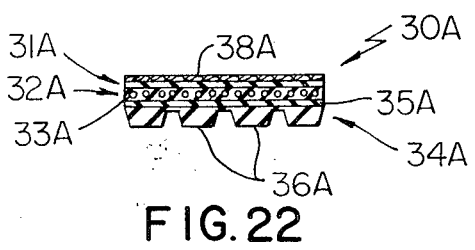

३,८३९,११६

METHOD OF MAKING ENDLESS POWER TRANSMISSION BELT HAVING A PLURALITY OF LONGITUDINALLY EXTENDING RIBS

BACKGROUND OF THE INVENTION

There are numerous endless power transmission belts in current use in industry, broadly categorized as V-belts which have longitudinally extending multiple ribs provided as an integral part thereof with such ribs being provided in either the tension section, compression section, or both the tension and compression sections of the belt; and each of these ribs may be of either V-shaped or roughly U-shaped cross-sectional configuration. However, it is comparatively difficult to build a quality belt of the character mentioned inexpensively because it is either necessary to provide expensive equipment and/or necessary to use complicated and time-consuming techniques, resulting in increasing the overall cost of each of these belts. Because the belt manufacturing industry is so highly competitive even a small reduction in manufacturing costs will usually give the manufacturer a marketing advantage.

SUMMARY

This invention provides an improved method of making endless power transmission belts each having a plurality of longitudinally extending ribs which may extend from the compression section, the tension section, or both the compression and tension sections thereof and such method employs a collapsible tubular matrix sleeve which is not only easy to use but also is reusable thereby enabling the manufacture of endless power transmission belts of the character mentioned comparatively inexpensively. The method of this invention enables the making of such endless power transmission belts wherein the longitudinally extending ribs thereof may be V-shaped, U-shaped, or may have some other shape, if desired.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which

FIG. 9 is an enlarged fragmentary cross-sectional view of the matrix sleeve with the cured and cooled belt sleeve in cross section and particularly illustrating the manner in which the rib stock material of the belt sleeve completely fills the circumferential grooves of the matrix sleeve;

FIG. 10 is a schematic illustration showing the removal of the drum from the matrix belt sleeves which are shown together as a unit;

FIG. 11 is a perspective view illustrating the matrix sleeve and the belt sleeve being separated by collapsing the matrix sleeve;

FIG. 12 is a view illustrating the manner in which the belt sleeve is supported on an associated mandrel and severed in predetermined sections with a cutter.

FIG. 13 is a view illustrating a typical section as cut in FIG. 12 in an inverted position and supported on an associated supporting mandrel and being finally cut by a cutter to define a plurality of belts substantially identical to the typical belt shown in FIG. 1;

FIG. 14 is a fragmentary view with certain parts in cross section particularly illustrating one method of forming a collapsible tubular matrix sleeve which may be used in the method of this invention and using a rubber material;

FIG. 15 is a perspective view with parts in cross section and parts broken away particularly illustrating another exemplary method of forming a matrix sleeve which may be used in the method of this invention and again using a rubber material.

FIG. 16 is a fragmentary view with parts in cross section, parts in elevation, and parts shown schematically particularly illustrating the making of an elongated strip of rubber material by molding process with such elongated strip being adapted to be used to define a matrix sleeve which may be used in the method of this invention;

FIG. 17 is a perspective view with parts in elevation, parts in cross section, and parts broken away particularly illustrating the extrusion of an elongated strip of plastic material which may be used to make a matrix sleeve and the cutting of a length of such extruded strip with such length being adapted to be wrapped concentrically around an associated drum to define the matrix sleeve;

FIG. 18 is a perspective view schematically illustrating the manner in which an elongated strip of elastomeric material made either by molding as shown in FIG. 16 or by extrusion as shown in FIG. 17 may be wrapped around an associated drum to define a matrix sleeve;

FIG. 19 is a fragmentary view with parts in cross section and parts shown schematically particularly illustrating a technique wherein a belt similar to the belt made in accordance with the steps illustrated in FIGS. 2–9 may be machined on the outside surface thereof to define a belt construction having longitudinally extending ribs provided on the top and bottom surface thereof;

FIG. 20 is a fragmentary cross-sectional view of a typical finished belt made using the teaching of FIG. 19;

FIG. 21 is a view similar to FIG. 19 illustrating the manner in which longitudinally extending ribs may be provided on the top and bottom surface of a belt similar to the belt of FIG. 20 by utilizing a matrix sleeve similar to the matrix sleeve illustrated in FIG. 2 on the inside of the assembly of components and an inverted matrix sleeve similar to and larger than the sleeve of FIG. 2 on the outside of the assembly of components to define the longitudinally extending ribs in the top and bottom surfaces of the belt by molding action;

FIG. 22 is a cross-sectional view illustrating another exemplary embodiment of a belt which may be made in accordance with the method of this invention and which is similar to the belt of FIG. 1;

FIG. 23 is a cross-sectional view illustrating another exemplary embodiment of a belt which may be made in accordance with the method of this invention and which is also similar to the belt of FIG. 1; and FIG. 24 is a view similar to FIG. 4 illustrating certain initial method steps during the making of the belt of FIG. 23.

DETAILED DESCRIPTION

Figure 1:
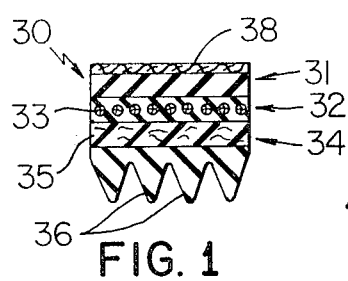
FIG. 1 is a cross-sectional view illustrating one exemplary embodiment of a belt made utilizing the method of this invention.

Reference is now made to FIG. 1 of the drawings which illustrates one exemplary embodiment of a belt made utilizing the method of this invention and such belt is designated generally by the reference numeral 30. The belt 30 comprises a tension section 31, a load carrying section 32 which includes a spirally wound load-carrying cord designated by the reference numeral 33, a compression section 34 which includes a platform layer 35 and a plurality of four (in this example) longitudinally extending integral belt elements or projections which will also be referred to herein as longitudinal ribs and each designated by the same reference numeral 36, and a top cover 38 made of a woven fabric impregnated with an elastomeric material. Each rib or element 36 of this exemplary belt 30 has a sharp apex or crest whereby each rib 36 may be considered as being V-shaped; however, it is to be understood that the method of this invention may be used to make belts having a plurality of ribs which are other than V-shaped whereby such ribs may be U-shaped or of trapezoidal outline, for example, and as will be explained in more detail subsequently.

Figure 2:
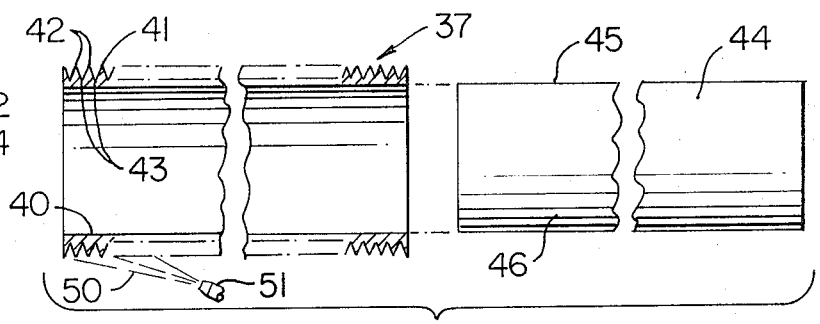
FIG. 2 illustrates a drum and matrix sleeve utilized in the method of this invention prior to assembling these two components.

The belt 30 is made utilizing the method of this invention and utilizing detailed method steps as will now be presented; and, for this presentation, reference is now made to FIGS. 2–13 of the drawings. In particular, the method of this invention utilizes a reusable matrix sleeve 37 which is shown in FIG. 2 and other FIGS. of the drawings cross-hatched generally for optimum contrast and ease of presentation; and, such sleeve may be made of any suitable material, preferably an elastomeric material, and is so constructed that it will retain its shape in a precise manner during the formation of an associated belt sleeve from which a plurality of belts 30, for example, may be cut. However, the matrix sleeve 37 is easily collapsible and once having been collapsed may be restored to its original configuration and reused to keep the costs of belts made using matrix sleeve 37 at a competitive minimum.

As will be apparent from FIG. 2, the collapsible and reusable tubular matrix sleeve 37 has an inside surface 40 which is preferably of right circular cylindrical configuration and an outside surface which is designated generally by the reference numeral 41 and defined by alternating circumferential projections 42 and grooves 43 which extend along the full axial length of the matrix sleeve 37. The inside surface 40 of the matrix sleeve 37 is such that it is particularly adapted to be supported on a drum 44 having a right circular cylindrical outside surface 45.

The drum 44 is of known construction and is particularly adapted to be used with a conventional belt curing device in a form of a so-called pot heater which is well known in the belt industry and is used to cure tubular sleeves used to make elastomeric power transmission belts. The surface 45 of drum 44 is coated with a suitable release agent 46 to enable the matrix sleeve 37 to be readily removed from such drum as will be explained in more detail subsequently.

The outside surface 41 of the matrix sleeve 37 is also preferably coated with a suitable release agent, using any technique known in the art; and, in this example a release agent 50 is applied using a spray-type nozzle 51 of conventional construction so that a substantially uniform thin coating of the relase agent 50 is applied against the outside surface 41 of the matrix sleeve 37. The relase agents 46 and 50 may be any suitable material such as a soap product, wax, teflon, or other material used in the art for this purpose.

The matrix sleeve 37 is supported concentrically around the cylindrical drum 44 and so that the opposed ends of such sleeve are arranged substantially in aligned relation with the opposed ends of the drum 44 whereupon the drum 44 and matrix sleeve 37 are ready for the buildup of an assembly of components which define a belt sleeve, to be described later, from which the belt 30 is cut.

Figure 3:
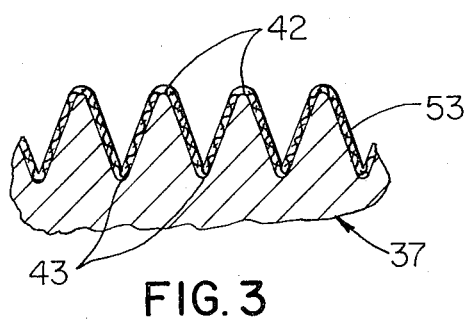
FIG. 3 is an enlarged fragmentary cross-sectional view illustrating a stretched fabric which may be applied on alternating circumferential projections and grooves comprising the outside surface of the matrix sleeve illustrated in FIG. 2 with the matrix sleeve being cross-hatched generally in this FIG. and in other FIGS. of the drawings to indicate any material even though it is preferably made of a suitable elastomeric material.

The relase agent coated matrix sleeve 37 may be covered with a highly stretchable woven cloth fabric, see FIG. 3, which is designated by the reference numeral 53 and such fabric is easily stretched in a plurality of directions. The stretable fabric 53 is used together with agent 50 to help prevent the remainder of components which are to be wrapped around the matrix sleeve 37 from sticking or adhering thereagainst. In addition, the physical properties of the woven fabric 53 and the volume occupied thereby serve to provide a space into which gases which are released during the step of curing the assembly of components used to define the belt sleeve are collected to assure such belt sleeve is free of defects which could result if gas pockets remained therein. The high stretchability of fabric 53 enables this fabric to assume or to be urged within the grooves 43 and against the projections 42 of the sleeve 37 in the manner illustrated in FIG. 3 even though initially and prior to curing of the belt sleeve to be built up on the matrix sleeve 37 the fabric 53 may not be snugly against the matrix sleeve as shown.

Once the fabric 53 has been placed in position a layer of elastomeric rib stock material 54 is wrapped around the drum 44 and the composition of such rib stock material is such that when finally cured its inner portion will conform very closely to the undulating sawtoothed configuration of the surface 41 of the matrix sleeve 37. See FIG. 4.

Once the rib stock material 54 has been placed in position an elastomeric platform material 55 is wrapped against the rib stock material 54 and the platform material may be in the form of a so-called stiflex rubber or may be in the form of rubber stock used for lateral automobile tire cords, for example. The platform material 55 in this example is shown as a stiflex material having a plurality of discrete fibers F embedded in an elastomeric matrix and the platform material serves to give the final belt 30 made from the method of this invention substantial transverse rigidity and also serves to help urge the rib stock material 54 into the grooves 43 of the sleeve 37 in a controlled and more uniform manner.

Once the platform material 55 has been wrapped or placed in position an elastomeric bottom cushion material 56 is wrapped against the platform material 55; and, the purpose of the bottom cushion material 56 will be described in more detail subsequently. Thus, it will be seen that the materials 54, 55, and 56 are wrapped or coiled around the sleeve 37 and against each other in the order outlined above to define the assembly of components illustrated in FIG. 4.

A load-carrying material is then coiled against the bottom cushion material 56 and this coiling step is achieved by wrapping a load-carrying cord against the bottom cushion material 56 and such cord will be designated by the same reference numeral 33 as in the completed belt. The cord 33 is wound or coiled in position under substantial tension which is a tension which is generally of the order of several times greater than the normal tension which would be applied in the manufacture of an ordinary endless power transmission belt or V-belt whereby the rib stock material 54 is urged or forced with substantial force against the matrix sleeve 37 to partially define ribs in the rib stock material and as illustrated at 57 in FIG. 5.

Figure 6:
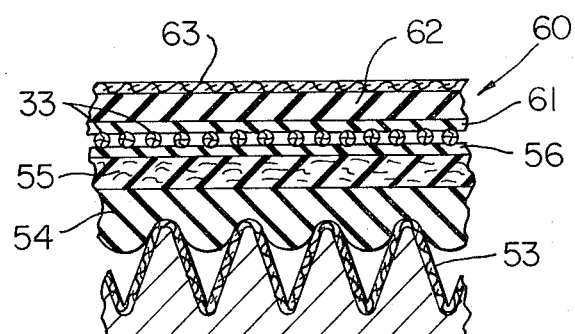
FIG. 6 is an enlarged fragmentary cross-sectional view of the matrix sleeve and illustrating a plurality of method steps by showing (in cross section) a top cushion material, a layer of elastomeric material, and a cover material which have been wrapped around the matrix sleeve and on the load-carrying cord while being wrapped concentrically against each other in the order stated.

Once the load-carrying cord 33 has been coiled or wound in position additional layers of elastomeric material are wrapped around the matrix sleeve 37 in a sequence now to be presented so as to define an assembly of components as illustrated in FIG. 6 which will be referred to as an uncured belt sleeve and designated generally by the reference numeral 60. In particular, a layer of a suitable elastomeric top cushion material 61 is first wrapped against the load-carrying cord 33 and the top cushion material 61 is preferably the same material used to make the bottom cushion 56.

Once the top cushion material 61 is wrapped in position, an outer layer of elastomeric material 62 is wound against the top cushion material 61; and, finally in this example, a cover material in the form of a fabric layer 63 which has been impregnated with a suitable elastomeric material is applied or wrapped against the outside surface of the outer layer of elastomeric material 62 to complete the uncured sleeve 60.

Figure 7:
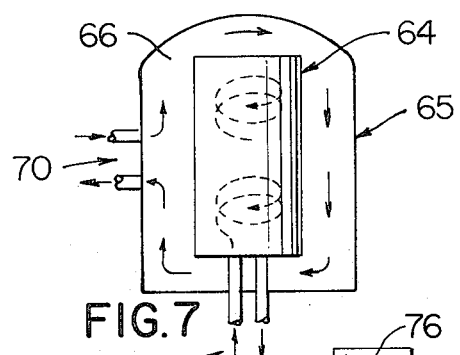
FIG. 7 is a schematic illustration showing the drum, matrix sleeve, and assembly of components shown in FIG. 6 which define a belt sleeve being cured in a curing device.

The assembled materials defining the uncured belt sleeve 60 together with supporting matrix sleeve 37 and drum 44 are placed as a unit, which for convenience, is designated by the reference numeral 64, in a suitable curing device 65 as illustrated in FIG. 7. The uncured sleeve 60 is cured or vulcanized in accordance with techniques known in the art and this curing is achieved by introducing steam under controlled temperatures and pressures into and out of the device 65. In particular, steam is introduced into and removed from the volume 66 surrounding the unit 64 as illustrated at 70; and, steam at a controlled temperature and pressure (which may be different than the temperature and pressure of the steam in volume 66) is introduced through the device 65 and within the drum 44 as illustrated at 71 whereupon curing and/or vulcanization of the sleeve 60 takes place. The curing device 65 may be of any suitable type known in the art and in the illustration of FIG. 7 is shown schematically as a so-called pot heater.

Figure 8:
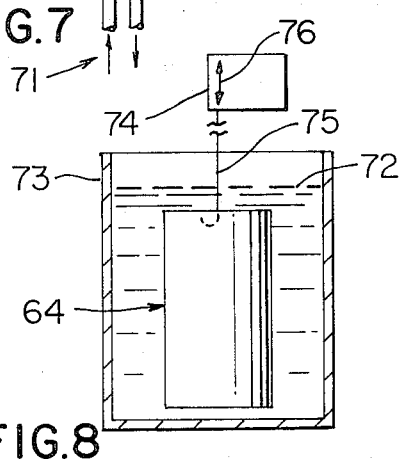
FIG. 8 is a schematic illustration showing the step of cooling the sleeves and drum in a liquid bath.

The unit 64 comprised of sleeves 37 and 60 and drum 44 are suitably cooled and although any suitable cooling may be employed the unit is shown in FIG. 8 being cooled by a cold liquid such as cold tap water 72 which is circulated in a continuous manner in a container 73. The cooling action is achieved by immersing the unit 64 in water 72 utilizing any suitable mechanism which is indicated schematically as an actuator 74 having a fastening device 75 extending therefrom and the device 75 is fastened at one end to the unit 64 and in particular to the drum 44 of such unit and at its opposite end to the actuator 74 which is capable of moving unit 64 vertically up and down as shown by the double arrow 76 in FIG. 8.

The now cured and cooled belt-defining sleeve or belt sleeve, also still designated by the reference numeral 60 for convenience and shown in FIG. 9, and matrix sleeve 37 may now be removed from the drum 44 and this removal action is illustrated schematically in FIG. 10 whereupon a suitable actuator 80 is attached to the drum 44 and holding means indicated schematically by a pair of arrows 81 is employed to hold the unit 64 defined by sleeves 37 and 60 in a substantially stationary position whereupon the drum 44 is simply pulled away from the sleeves 37 and 60. The holding means 81 may be in the form of a plate having a circular opening therein with such opening being dimensioned so as to allow pulling the drum 44 therethrough or the holding means 81 may be in the form of a holding apparatus having a plurality of grasping plates which cooperate to grasp the outside surface of the cured sleeve 60 and hold unit 64 firmly in position while the drum 44 is being pulled away by the actuator 80.

Figure 5:
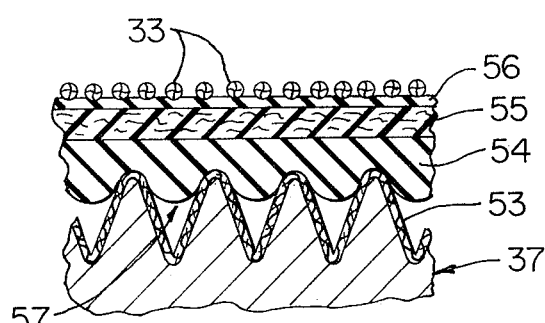
FIG. 5 is an enlarged fragmentary cross-sectional view similar to FIG. 4 and particularly illustrating the step of winding a load-carrying cord against the bottom cushion material of FIG. 4 under substantial tension and showing the rib stock material partially urged within the grooves of the matrix sleeve.

The cured belt sleeve 60 has integral circumferential ribs comprising its inside surface with the ribs each being given the same reference numeral 36 as the longitudinal ribs 36 of the belt 30 because they define ribs 36 in the completed belt 30; further, it will be appreciated that such ribs are defined by the circumferential grooves 43 in the matrix sleeve 37. Further, as shown in FIG. 9, the step of coiling the load-carrying cord 33 as illustrated in FIG. 5 and the curing step shown in FIG. 7 cooperate to assure that circumferential ribs are defined in the rib stock material 54 to define the longitudinal ribs or elements 36 of each completed belt 30.

Once the drum 44 has been removed from within the cooled sleeves 37 and 60, these two sleeves are separated and this is achieved by collapsing the matrix sleeve 37, essentially as illustrated at 83 in FIG. 11, from within the belt sleeve 60 whereupon with the sleeve 37 in a collapsed condition it is easily removed from within the belt sleeve 60 by pulling sleeves 36 and 60 axially apart. It will be appreciated that the release agent 50 applied on the outside surface 51 of the sleeve 37 and the fabric layer 53 enables easier separation of the matrix sleeve 37 from within the belt sleeve 60. The fabric layer 53 in this example is discarded.

Once the belt sleeve 60 is separated from the matrix sleeve 37 it is cut to define a plurality of endless power transmission belts 30 and preferably this cutting step is achieved as illustrated in FIGS. 12 and 13. In particular this cutting step comprises the steps of cutting the belt sleeve into a plurality of tubular sections each designated by the same reference numeral 84 in FIG. 12 with this cutting being achieved utilizing any suitable cutter such as a standard cutter 85 and employing cutting techniques which are well known in the art. The cutting of a plurality of sections 84 is preferably achieved while supporting the sleeve 60 on an associated supporting mandrel 86.

Sections 84 are then inverted and a typical inverted section 84 is illustrated at 90 in FIG. 13 while being supported on an associated supporting mandrel 91 whereupon another cutter 92, which may be similar to the cutter 85, may be employed to final cut each section 84 and define a plurality of belts 30 from each section 84.

A plurality of belts 30 are thus defined in a simple and compratively inexpensive manner utilizing a comparatively inexpensive collapsible tubular matrix sleeve 37 and such sleeve may be reused numerous times to keep the manufacturing costs at a minimum.

In order that the various layers of material wound around the sleeve 37 may be readily correlated with the appropriate components of the completed belt, it will be noted that the rib stock material 54 defines the longitudinally extending ribs 36 of the compression section 34, the platform material 55 defines the stiflex platform 35 of the compression section 34, the load-carrying cord of the load-carrying section 32 is designated by the same reference numeral 33 in both the belt sleeve 60 and the belt 30, the top and bottom cushions 56 and 61 cooperate to define a single mass of elastomeric matrix or carrier material of the tension section 32 within which the load-carrying cord 33 is embedded, the tension section layer 62 defines the tension section 31, and finally the cover fabric layer 63 defines the cover 38 of the belt 30.

The collapsible tubular matrix sleeve 37 may be formed in various ways, to be subsequently described. However, regardless of the manner in which it is formed, it is preferably made of such a material that it will retain its shape with repeated use and in the manner presented above. In one application of this invention a rubber compound was used having a hardness of 95 as measured using the known Shore Durometer and using the A scale and such compound provided satisfactory results. The number of times that the sleeve 37 may be reused will vary depending upon the detailed properties of material employed and may vary from 15 to 200 times.

The step of forming collapsible tubular matrix sleeve 37 may be achieved by forming such sleeve any number of ways as indicated above and as illustrated in FIGS. 14–18 of the drawings. For example, the sleeve 37 may be made by machining a tubular matrix sleeve to define the outside surface 41 having alternating projections 42 and grooves 43. In the FIG. 14 example, this machining is achieved by supporting a collapsible tubular sleeve made of an elastomeric material and having a right circular cylindrical outside surface as indicated by dotted lines 95 on a supporting mandrel 96 and grinding the surface 95 with a grinder or grinding wheel 97 to define the outer surface 41 of a completed sleeve 37 with such surface 41 having alternating projections 42 and grooves 43.

A matrix sleeve 37 may also be made by molding process as illustrated in FIG. 15 which schematically illustrates a mold 99 of known construction within which a tubular elastomeric workpiece is placed. The mold 99 has a toothed inside surface 100 against which the outside surface of the tubular workpiece is urged during the molding action to define sleeve 37 with its outside surface 41 having alternating integral projections 42 and grooves 43. This molding of matrix sleeve 37 is achieved using any suitable elastomeric material and in accordance with techniques well known in the art wherein an uncured workpiece is urged outwardly against surface 100 and cured in position followed by conventional cooling of the cured matrix sleeve 37.

The matrix sleeve 37 may be made from an elongated strip 101 of elastomeric material having integral projections and grooves therein and the elongated strip 101 may be formed by molding process using a mold 102 having a toothed flat surface 103 therein as shown in FIG. 16. The molding is achieved by applying a controlled temperature and pressure on a strip or section of elastomeric material such as rubber which initially has opposed flat surfaces to urge one flat surface thereof against toothed surface 103 and define alternating projections 105 and grooves 106 in the strip 101.

A strip also designated by the reference numeral 101 may also be made by extruding an elastomeric material, shown as a plastic material in FIG. 17, through an extrusion die 107 having a die opening therein with grooves 108 and projections 109 defining such die opening to define projections 105 and grooves 106 respectively in the strip 101 of elastomeric material.

A predetermined length of the strip 101, regardless of whether it is made by molding process or by extrusion process and such predetermined length is designated by the reference numeral 110 in FIG. 18, may be used to make a matrix sleeve. The length 110 of strip 101 is suitably attached using any technique known in the art around the drum 44 to define the matrix sleeve 37 therearound so that the projections 105 and grooves 106 of the strip 101 in tubular or coiled form respectively define the alternating circumferential projections 42 and grooves 43 of the outside surface 41 of sleeve 37.

Any suitable method or technique may be employed to attach strip 101 around the drum 44 and prior to attachment thereof it will be appreciated that a suitable release agent such as release agent 46 will be applied against the outside surface 45 of such drum.

The elongated strip of elastomeric material 101 which may be formed by either molding or extrusion process may be of a width which is several or more times less than the height of the drum 44. In this latter instance a plurality of narrow strips each having a length 110 may be arranged in axially aligned abutting relation along the surface 45 of the drum 44 to define the matrix sleeve 37. Thus, the sleeve 37 is defined by a plurality of axially aligned tubular pieces or components and so that the projections and grooves of the strips as fastened into position around the drum 44 cooperate to define the outside surface 41 of the matrix 37 and hence the projections 42 and grooves 43 thereof.

The basic method of this invention may be employed to make endless power transmission belts having a plurality of longitudinally extending ribs wherein such plurality of ribs are provided on both sides of the belt and in particular define the top and bottom thereof. For example, as shown in FIG. 19, a belt sleeve 113 made in accordance with this invention and similar to the cured and cooled belt sleeve 60 may be suitably supported on a mandrel and an outer portion 114 thereof may be formed by machining action such as by grinding utilizing a grinder 115 so that the resulting completed sleeve 113, after grinding, has alternating circumferential projections and grooves provided on both its inside and outside surfaces. The completed sleeve 113 is then cut in axial lengths to define a plurality of belts such as the belt 116 shown in FIG. 20 with the belt having longitudinally extending ribs 117 extending from its top and bottom surfaces and defined by the ribs of the completed sleeve 113. The belt 116 also has a load-carrying cord 120 arranged substantially centrally therein so that its longitudinal ribs 117 are arranged in a symmetrical manner on opposite sides thereof.

A belt similar to the belt 116 of FIG. 20 may also be made by molding using an inner matrix sleeve 121 which is similar to matrix sleeve 37 and an outer matrix sleeve 122 similar to an inverted sleeve 37 of larger size to define a completed sleeve 113 as shown in FIG. 21. The sleeve 113 may then be suitably cut to define a plurality of belts 116. In particular, during the abovementioned molding step the second larger size matrix sleeve is placed against an outer layer of the belt sleeve and urged snugly against the belt sleeve prior to the curing step. During the curing step pressure is applied against the second matrix sleeve to assure the forming of circumferential ribs in the outer layer of the belt sleeve. The circumferential ribs in the inner layer of the belt sleeve are defined by such inner layer being urged against the inner matrix sleeve. These cooperating matrix sleeves 121 and 122 define the belt sleeve 113 which is then cut to define belts 116.

The method of this invention may be used to make a belt with longitudinal ribs other than V-shaped. For example, substantially the identical method steps used to make belt 30 may be used to make the belt 30A illustrated in FIG. 22. The belt 30A has a top cover 38A, a tension section 31A, a load-carrying section 32A including a spirally wound load-carrying cord 33A, and a compression section 34A comprised of a stiflex layer 35A and a plurality of four roughly U-shaped or substantially trapezoidal ribs or elements 36A.

Each belt 30 and 30A made in accordance with this invention is shown as having a plurality of four ribs or elements in its compression section; however, the belt 30A can have any desired number of U-shaped elements 36A.

The belts 30 and 30A are shown with their respective elements 36 and 36A without a cover and are thus called raw edged elements; however, it will be appreciated that a cover may be provided thereon and such cover may be provided in a similar manner as illustrated in FIG. 3 employing a suitable stretch fabric material which has been coated with a suitable elastomeric material on the side thereof which faces outwardly from the sleeve matrix so that once the rib stock material is urged thereagainst and the assembled components suitably cured in a similar manner as described in detail in connection with the belt 30 another exemplary embodiment of the belt is defined and such belt is designated by the reference numeral 30B and has a cover 124B provided on its integral ribs as illustrated in FIG. 23 with such cover being defined by the stretch fabric which will also be designated by the reference numeral 124B. With this exception the belt 30B is very similar to the belt 30 and is made utilizing substantially similar method steps described for the belt 30 whereby in addition to the rib cover 124B the belt 30B has a top cover 38B, a tension section 31B, a load-carrying section 32B, and a compression section 34B comprised of a stiflex layer 35B and a plurality of V-shaped ribs or elements 36B.

Figure 4:
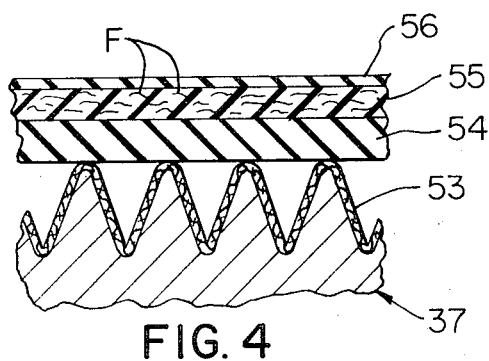
FIG. 4 is an enlarged fragmentary cross-sectional view of the matrix sleeve and illustrating a plurality of method steps by showing (in cross section) rib stock material, platform stock material, and a bottom cushion material which have been wrapped around the matrix sleeve and concentrically against each other in the order stated.

In the course of making the belt 30B the build-up or assembly of materials is very similar to the build-up as illustrated in FIGS. 4, 5, and 6 and described in connection with the belt 30 whereby such build-up will not be repeated. However, instead of wrapping a stretch fabric around the sleeve matrix 37 as a separate unit and in a separate step the stretch fabric 124B and rib stock material 54 may be wrapped concentrically around the sleeve matrix simultaneously followed by wrapping layers 55, and 56 in position as illustrated in FIG. 24 which is similar to FIG. 4 of the drawings. Once the assembly of materials shown in FIG. 24 is provided, the remainder of the belt sleeve defining materials are wrapped in position in a substantially identical manner as illustrated and described in FIGS. 5 and 6 for the belt 30; and, upon further processing of the components in a similar manner as previously described for the belt 30 the belt 30B is defined. It will also be appreciated that the stretch fabric 124B may be adhered or bonded to the rib stock material 54 and the two layer construction thus defined wrapped concentrically around the matrix sleeve as a unit. This bonding or fixing of stretch fabric to rib stock material may be achieved by spot bonding adjoining surfaces at spaced intervals.

In any event, regardless of whether the stretch fabric or material is applied against the matrix sleeve or is pre-laminated or bonded against the rib stock material and regardless of whether the stretch fabric defines an outer covering for the ribs of its associated belt it serves to absorb bleed-off gases during the curing of the assembled components used to define the belts of this invention as well as aids in release of the belt sleeve from its matrix sleeve.

It will also be appreciated that a suitable flock material may be provided, using any technique known in the art, between the matrix sleeve and the rib stock material in lieu of or in addition to the stretch fabric and such flock material would help absorb bleed-off gases during curing as well as serving as a release agent.

While present exemplary embodiments of this invention, and methods of practicing the same, have been illustrated and described it will be recognized that this invention may be otherwise variously embodied and practiced within the scope of the following claims.

What is claimed is:

1. A method of making endless power transmission belts each having a plurality of longitudinally extending ribs, said method comprising the steps of, forming a collapsible tubular matrix sleeve having an outside surface defined by alternating circumferential projections and grooves, supporting said matrix sleeve on a cylindrical drum, wrapping a layer of elastomeric rib stock material around said outside surface, coiling a load-carrying material around said layer of rib stock material, winding an outer layer of elastomeric material around said load-carrying material, placing said drum and matrix sleeve with said materials assembled therearound in a curing device, curing the assembled materials to define a belt sleeve having integral circumferential ribs comprising its inside surface with said ribs being defined by said circumferential grooves in said matrix sleeve, said coiling and curing steps cooperating to assure said circumferential ribs are defined in said rib stock material, cooling said sleeves and drum, and cutting said belt sleeve to define a plurality of said belts each having said plurality of longitudinally extending ribs defined by corresponding circumferential ribs.

2. A method as set forth in claim 1 and comprising the further step of removing said matrix sleeve and belt sleeve from said drum prior to said cutting step.

3. A method as set forth in claim 2 in which said removing step comprises removing said matrix sleeve and said belt sleeve from said drum as a unit and comprising the further step of separating said belt sleeve from said matrix sleeve prior to said cutting step.

4. A method as set forth in claim 3 in which said separating step comprises collapsing said matrix sleeve from within said belt sleeve.

5. A method as set forth in claim 4 and comprising the further step of expanding said matrix sleeve from its collapsed condition and reusing said matrix sleeve by again supporting said matrix sleeve on said cylindrical drum.

6. A method as set forth in claim 2 in which said coiling step comprises coiling said load-carrying material in the form of a comparatively inextensible load-carrying cord with a controlled tension which is generally of the order of several times greater than the tension normally applied during the coiling of a load-carrying cord in the usual manufacture of a belt, said substantial tension assuring that said circumferential ribs are partially defined in said rib stock material during said coiling step.

7. A method as set forth in claim 2 and comprising the further step of wrapping a layer of elastomeric platform material against said rib stock material prior to said coiling step.

8. A method as set forth in claim 7 and comprising the further steps of wrapping a layer of elastomeric bottom cushion material against said platform material prior to said coiling step followed by coiling said load-carrying material against said elastomeric bottom cushion material, and wrapping a layer of elastomeric top cushion material against said load-carrying material prior to said winding step.

9. A method as set forth in claim 8 and comprising the further step of applying a cover material against said outer layer of elastomeric material prior to said placing step to thereby define said belt sleeve having an outer cover.

10. A method as set forth in claim 1 and comprising the further step of covering said matrix sleeve with a highly stretchable woven fabric prior to said step of wrapping said rib stock material around said outside surface of said drum, said woven fabric providing a volume for receiving gases released during said curing step.

11. A method as set forth in claim 4 in which said cutting step comprises the steps of, cutting said belt sleeve in a plurality of tubular sections, inverting each tubular section and supporting it on a mandrel, and cutting the inverted tubular sections to define said belt.

12. A method as set forth in claim 1 in which said step of forming said collapsible tubular matrix sleeve comprises machining a tubular matrix sleeve to define said outside surface having alternating circumferential projections and grooves.

13. A method as set forth in claim 1 in which said forming step comprises supporting a collapsible tubular matrix sleeve made of an elastomeric material and having a right circular cylindrical outer surface on a supporting mandrel and grinding said outer surface with a grinder to define said outer surface defined by said alternating circumferential projections and grooves.

14. A method as set forth in claim 1 in which said forming and supporting steps comprise extruding an elastomeric material through an extrusion die having grooves and projections therein to define a strip of elastomeric material having corresponding integral projections and grooves respectively, cutting a length of said strip, and attaching said length of said strip concentrically around said drum to define said matrix sleeve therearound so that the projections and grooves of said strip define said outside surface of said matrix sleeve and hence said alternating circumferential projections and grooves.

15. A method as set forth in claim 1 in which said forming step comprises making said matrix sleeve of an elastomeric material by molding process.

16. A method as set forth in claim 15 in which in said forming step wherein said matrix sleeve is made by molding process said sleeve is molded in tubular form.

17. A method as set forth in claim 1 in which said forming and supporting steps comprise the steps of making an elongated strip of elastomeric material having integral projections and grooves, cutting a length of said strip, and attaching said strip concentrically around said drum to define said matrix sleeve therearound so that the projections and grooves of said strip define said outside surface of said matrix sleeve and hence said circumferential projections and grooves.

18. A method as set forth in claim 17 in which said step of making said elongated strip comprises making said strip by molding.

19. A method as set forth in claim 17 in which said step of making said elongated strip comprises making said strip by extrusion.

20. A method as set forth in claim 17 and comprising the further steps of cutting at least another length of said strip and attaching said other length around said drum adjoining said first-named strip in axially aligned relation therewith to define said matrix sleeve in a plurality of pieces and so that the projections and grooves of said strips cooperate to define said outside surface of said matrix sleeve and hence said circumferential projections and grooves.

21. A method as set forth in claim 1 and comprising the further step of forming said outer layer of elastomeric material to define circumferential ribs therein prior to said cutting step so that each of said belts has said longitudinally extending ribs provided on the top and bottom thereof.

22. A method as set forth in claim 21 in which said step of forming said outer layer comprises machining said outer layer.

23. A method as set forth in claim 21 in which said step of forming said outer layer comprises grinding said outer layer with a grinder.

24. A method as set forth in claim 21 in which said step of forming said outer layer comprises molding said outer layer to define said circumferential ribs therein.

25. A method as set forth in claim 24 in which said step of molding said outer layer comprises placing a second matrix sleeve against said outer layer and urging said second matrix sleeve thereagainst prior to placing said drum and matrix sleeve in a curing device and applying pressure against said second matrix sleeve during said curing step to assure the formation of circumferential ribs in said outer layer, and following said cutting step each of said belts has longitudingally extended ribs provided on the top and bottom thereof.

26. A method as set forth in claim 1 and comprising the further step of wrapping a highly stretchable fabric against said outside surface of said drum simultaneously with said step of wrapping a layer of elastomeric rib stock material around said outside surface of said drum, said highly stretchable fabric providing a volume for receiving gases released during said curing step.

27. A method as set forth in claim 26 and comprising the further step of adhering said highly stretchable fabric against a surface of said rib stock material to define a pre-laminated construction prior to said simultaneous wrapping of highly stretchable fabric and rib stock material around said drum.

28. A method as set forth in claim 27 wherein said highly stretchable woven fabric is woven fabric which is integrally bonded to said rib stock material during said curing step to define a belt wherein each of said plurality of longitudinally extending ribs has a covering of said woven fabric bonded thereon.

* * * * *